Aug. 29, 1950 G. J. GIEL, JR 2,520,761

FACSIMILE RECORDING APPARATUS

Filed Aug. 7, 1946 3 Sheets-Sheet 1

INVENTOR.

George J. Giel Jr.

FACSIMILE RECORDING APPARATUS

Filed Aug. 7, 1946 3 Sheets-Sheet 2

INVENTOR.

George J. Giel Jr.

FACSIMILE RECORDING APPARATUS

Filed Aug. 7, 1946 3 Sheets-Sheet 3

INVENTOR.
GEORGE J. GIEL JR.,
BY Eric A. Rose
ATTORNEY.

Patented Aug. 29, 1950 2,520,761

UNITED STATES PATENT OFFICE 2,520,761

FACSIMILE RECORDING APPARATUS

George J. Giel, Jr., Flint, Mich.

Application August 7, 1946, Serial No. 688,903

2 Claims. (Cl. 178—6.6)

The present invention relates to an apparatus for facsimile recording and graphic expansion of originals and the like, and particularly to an apparatus reproducing originals on enlarged or reduced scale using electronic circuits.

In the art of facsimile recording, the original is broken up electrically into separate small elements and transformed into electrical impulses which are transmitted to a recording unit and there reassembled into their original position to form a reproduction of the original.

Two methods are commonly employed for the purpose of receiving and recording the electrical impulses originating in photo-electric units which are used for scanning the original deposited upon a scanning drum. In one case, the reproduction is accomplished by the use of a marking head carrying a stylus or engraving tool; where a stylus is used, the record is made on electrolytic recording paper, which paper is well known to the art and in wide use. In the other case, a marking bar and "helix" wire, which wire is disposed in one helical turn about the axis on the surface of a recording drum, is used for recording the copy on electrolytic recording paper.

An important part of the receiving operation in systems using either method is the necessity of synchronizing and phasing, or meshing, of the transmitting and receiving units of the apparatus, and particularly the meshing of scanning and recording heads and scanning and recording drums respectively.

While in tele-facsimile systems the stations are meshed by electrical means, in stationary facsimile recording units, scanning and recording assemblies are meshed by mechanical or electrical means. Inaccurate synchronization will result in distortion of the copy.

It is one of the features of the present invention to control the distortion resulting from the rotation and movement at different speeds of the scanning and recording assemblies respectively, facilitating thereby the enlargement or reduction in size of the recorded copy with respect to the original, and also permitting a controlled distortion in width or length only of the recorded copy in any desired proportion.

A primary object of the invention is therefore to provide an apparatus for facsimile recording and the like, which will permit the graphic expansion of the original on the recorded copy resulting in the enlargement or reduction of the recorded copy in any desired ratio to the size of the original. A further object is to provide an apparatus of the class described which is simple in construction, inexpensive to build, and adjustable to facilitate a controlled horizontally or vertically distorted reproduction of an original, and at the same time produce reproductions of high accuracy and durability. A still further object of the invention is to provide an apparatus for facsimile recording which will produce object lines of original drawings, but will entirely eliminate in transmission project lines, construction lines and other undesired smudges, resulting in a clean copy of improved appearance over the original. A still further object of the present invention is to provide an apparatus adapted to reproduce ink or pencil drawings on templets of any desired size proportional to the size of the original.

Additional objects, together with further advantages derived in utilizing the present invention, will become apparent from the following detailed description thereof taken together with the accompanying drawings forming part of the specification, in which similar characters of reference represent corresponding parts in the several views:

Figure 1 is a schematic diagram of a facsimile recording apparatus using a recording stylus and embodying features of the present invention, Figure 2 is a circuit wiring diagram of the smudge rejector shown in Figure 1, Figure 3 is a graph showing the amplifier output and smudge rejector output in relation to corresponding areas viewed by the photo-electric scanning head of Figure 1, Figure 4 is a schematic diagram in perspective of a facsimile recording apparatus with marking bar-helix wire recording mechanism, and embodying in modified form, features of the present invention.

Figure 1:
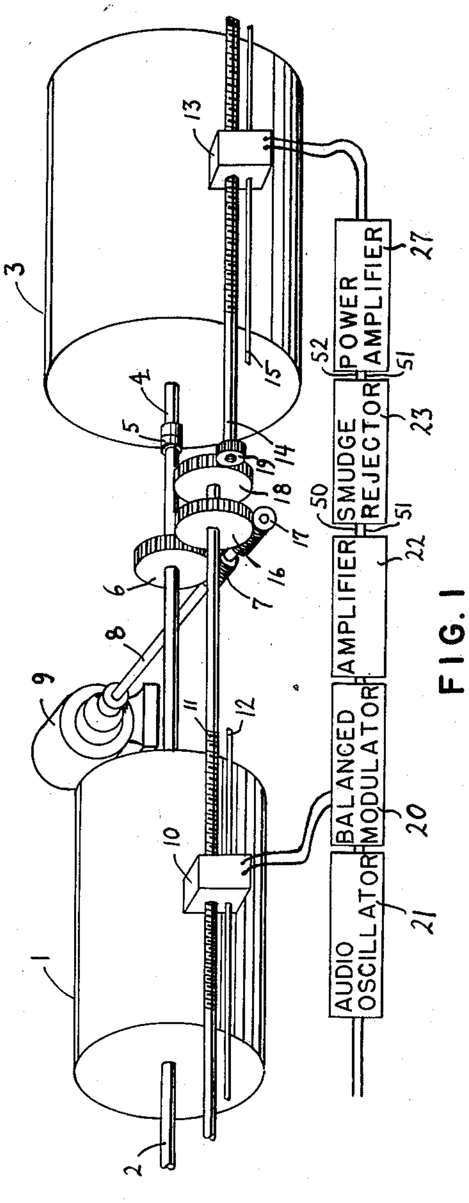

Referring to the characters of reference on the drawings, wherein for the purpose of illustration is shown a preferred embodiment of my invention, the facsimile recording and graphic expansion apparatus comprises a scanning drum 1 mounted on a driving shaft 2, a recording drum 3 having a diameter twice that of the scanning drum 1, and secured to a shaft 4, a suitable coupling 5 connecting driving shaft 2 to shaft 4, electrical driving means effecting the axial movement of the said shafts and determining the resulting angular velocity of scanning drum 1 and recording drum 3, said electrical driving means comprising a spur gear 6 secured to driving shaft 2 and engaging a worm gear 7, which latter worm gear is keyed to motor extension shaft 8 and driven by electric motor 9.

A scanning head 10 is disposed radially and in spaced relation to scanning drum 1 and movable axially to said drum by means of a tapped split nut or the like mounted inside the scanning head and suitable to engage a threaded shaft 11 extending through said split nut and positioned axially along the surface of scanning drum 1. A guide rod 12 also disposed axially along the surface of scanning drum 1 passes in slidable relation through a suitable sleeve mounted inside the scanning head 10, and holds said scanning head in a fixed tangential relation to the scanning drum 1.

The marking head 13 disposed radially and in spaced relation to recording drum 3 and movable axially to said drum, comprises a tapped split nut or the like suitable to engage a threaded shaft 14 extending through said split nut and disposed axially along the surface of the recording drum 3, and a suitable sleeve through which passes in slidable relation a guide rod 15 disposed axially along the surface of recording drum 3 and holding the marking head 13 in fixed tangential relation to recording drum 3.

The threaded scanning head carrying shaft 11 is driven by the electric motor 9 through a gear transmission comprising a spur gear 16 keyed to shaft 11, and engaging a worm gear 17 secured to motor extension shaft 8.

A variable speed transmission positioned between threaded scanning head carrying shaft 11 and threaded recording head carrying shaft 14, comprises, in the embodiment of the invention shown in Figure 1, a driving spur gear 18 mounted on the extremity of shaft 11 and a driven spur gear 19 mounted on the end of shaft 14, resulting in the axial rotation of the said shafts at determined differential speeds and thereby causing scanning head 10 and marking head 13 to move axially on the respective shafts at corresponding speeds.

The scanning head 10, well known to the art, normally comprises a source of light adapted through optical means to concentrate a spot of light on the scanning drum 1, and optical means collecting and delivering the reflected light rays to a photo-electric cell. The scanning head 10, illustrated in Figure 6, consists of a source of light 71, a lens 72, concentrating a spot of light on the scanning drum 1, and lenses 73 and 74, collecting and delivering the reflected light to a photo-electric cell 75. The electrical impulses produced by the photo-electric cell are transmitted to a balanced modulator 20, which latter may be of standard design and will comprise a balanced resistance-capacitance bridge so constructed that a change of the amount of light entering the photo-electric cell produces an unbalance in said bridge and hence a resultant amplitude modulation of a signal originating in the audio oscillator 21. The audio oscillator 21 may be of standard design, delivering a continuous sinusoidal signal to the balanced modulator 20. In the embodiment of the invention shown in Figure 1, the balanced modulator was used to facilitate the use of alternating current amplification. Provision is also made in said balanced modulator 20 for the manual control of the original balance of the resistance-capacitance bridge, and control of the direction of unbalance so that an increase in the reflected light from the original produces either an increase or decrease in signal output as the recorded copy is desired to appear either as a positive or a negative.

The output of the audio oscillator 21 is fed into the resistance-capacitance bridge 60 through transformer 61. The resistance-capacitance bridge 60 consists of potentiometers 62 and 63 with balancing resisters 64 and variable capacitor 65.

Figure 5:
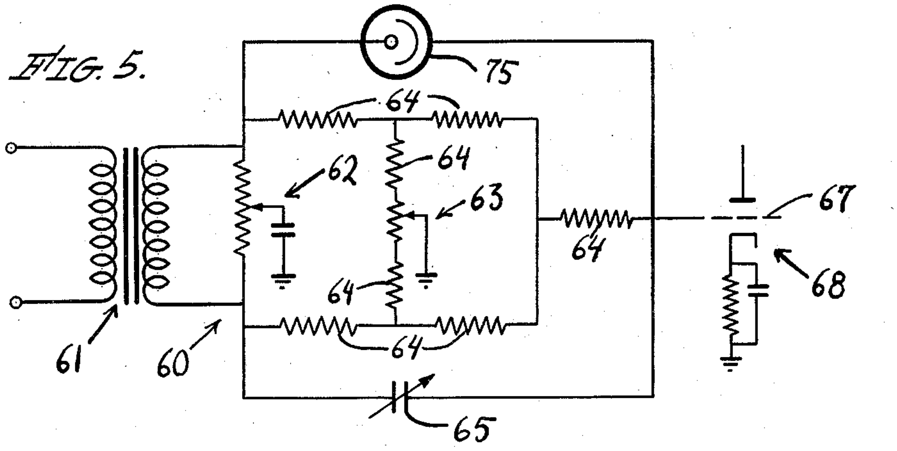
Figure 5 is a circuit wiring diagram of the balanced modulator shown in Figure 1.

The output of photo-electric cell 75 is fed into the resistance-capacitance bridge, as shown in Figure 5. The output of the resistance-capacitance bridge 60 is connected to the control grid 67 of the first amplifier tube 68, of an aperiodic amplifier 22 of standard design.

In operation, potentiometers 62 and 63 are used to adjust the amplitude of the electrical impulses which pass through the bridge 60 controlling, in effect, the amount of original unbalance. The direction of this unbalance determines whether an increasing impedance of the photo-electric cell 75 by scanning a white area for example, will result in either an increase or decrease of the potential of the grid 67 of the first amplifier tube 68.

Figure 2:
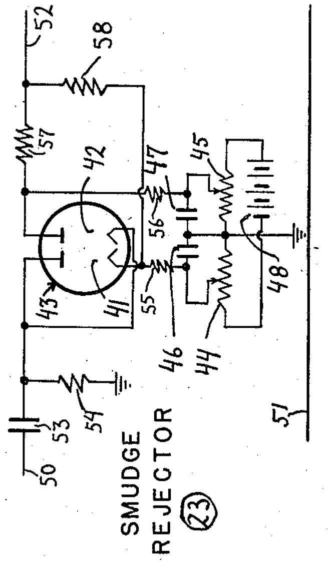
Figures 3, 4:
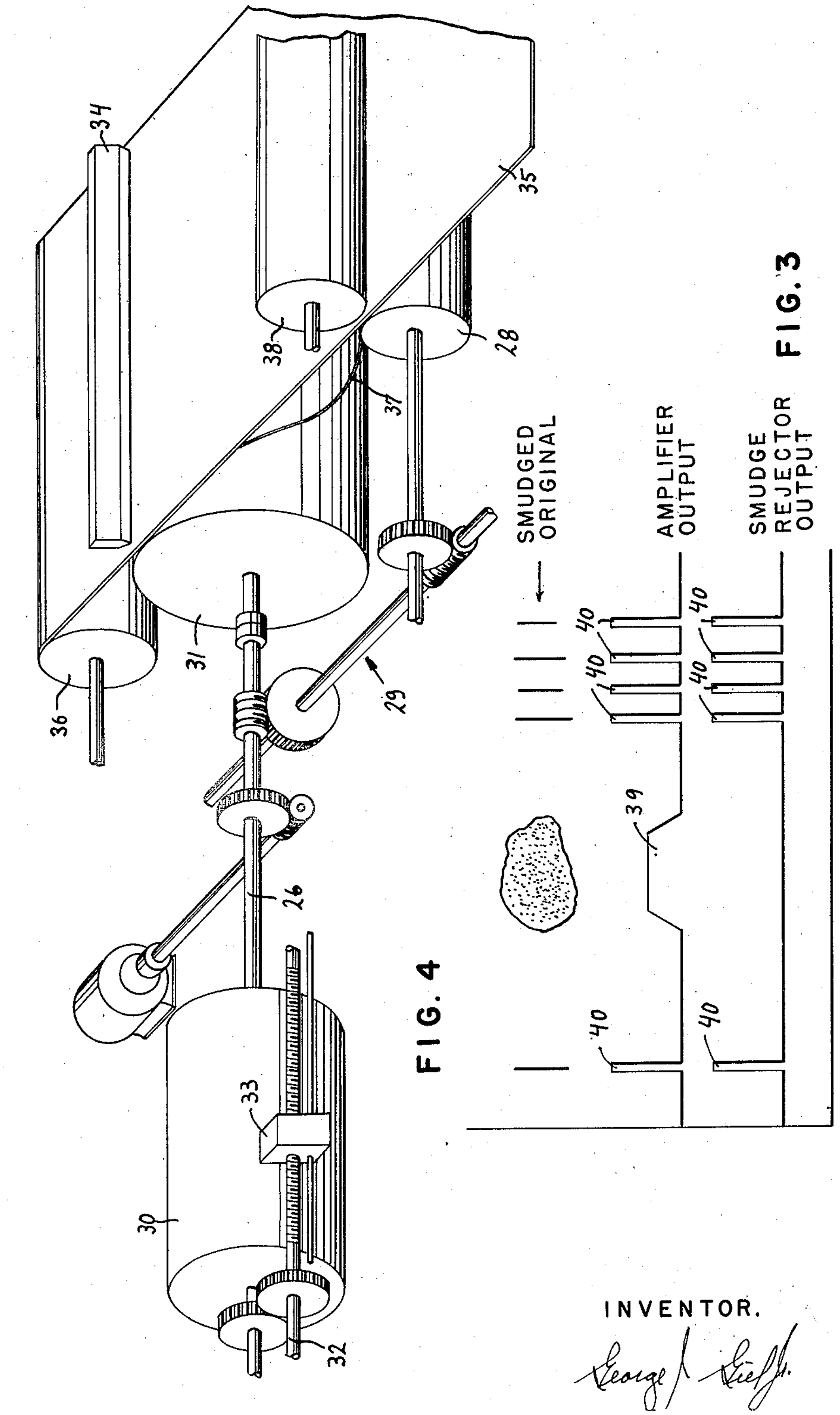

The resistance-capacitance bridge 60 is initially unbalanced in one direction or the other, and a change of the impedance of the photo-electric cell 75 with incident light furthers the unbalance and produces thereby a greater amplitude output from the resistance-capacitance bridge 60. If the original unbalance is in one direction, the increase in light on the photo-electric cell 75 produces a decrease in amplitude, and if the bridge is originally unbalanced in the opposite direction, increasing light will produce an increase in amplitude. The potentiometer controls 62 and 63 will therefore permit the production of either positive or negative prints. The output of the amplifier 22, shown graphically in Figure 3, is fed into the smudge rejector 23. The smudge rejector circuit, illustrated in Figure 2, has for its purpose the elimination of undesired smudges and lines appearing on the original from the recorded copy. In this circuit, lead 51 connected to the output terminal of aperiodic amplifier 22, passes through the smudge rejector 23 and is coupled to power amplifier 27. The other lead 50 connects the other output terminal of aperiodic amplifier 22 to the anode of diode 41 and the cathode of diode 42 in the dual diode tube 43 through a capacitor 53 and its by pass resistor 54. The cathode of diode 41 and the anode of diode 42 are connected to the adjustable contact of potentiometers 44 and 45 respectively through fixed resistors 55 and 56 respectively and to ground through by-pass capacitors 46 and 47 respectively. Battery 48 is connected across potentiometers 44 and 45, the common terminals of said potentiometers being grounded, and supplies the bias or blocking voltage to the dual diode tube 43. Lead 52, connected to the anode of diode 42 through mixing resistor 57 and to the cathode of diode 41 through mixing resistor 58, is coupled to the input terminal of power amplifier 27. Potentiometer controls 44 and 45 permit the adjustment of the bias and hence the controlled limiting of the amplitude of the signal currents applied to dual diode tube 43. The potentiometer controls together with the manual contrast controls of the resistance-capacitance bridge of the balanced modulator 20, constitute the smudge rejection system.

The output of the smudge rejection circuit is shown graphically in Figure 3, where it is shown that the circuit eliminates signal current amplitude changes below a predetermined level and passes signal current amplitude changes above that predetermined level. The amplitude level to which the smudge rejection circuit will be adjusted, will depend upon the strength of the electrical impulses produced by the photo-electric cell, which electrical impulses will be stronger for object lines on original drawings and the like, and weaker for construction lines and other undesired smudges.

The output of the smudge rejector is fed by means of leads 51 and 52 into power amplifier and matching circuit 27, which latter power amplifier and matching circuit may be of conventional design. The output signal of the power amplifier and matching circuit 27 is then applied to the marking stylus of marking head 13. The passage of the current between the marking stylus and the grounded recording drum 3 through an electrolytic recording paper produces a mark on said paper corresponding to the markings viewed by the photo-electric cell located in scanning head 10.

In operation, the original is placed on scanning drum 1. When said drum is rotated at a determined speed, scanning head 10 travels axially along scanning drum 1, scanning the original, a process well known to the art. The electric impulses originating in the photo-electric cell, located in the scanning head 10, are then transmitted through the electronic transmission circuit described above, to the marking stylus of the marking head 13.

If a 2:1 enlargement is desired, the gear ratio of driving spur gear 18 to driven spur gear 19 must also be 2:1, and the diameter of the recording drum 3 must be twice that of scanning drum 1. In this case, marking head 13 will travel axially along recording drum 3 at twice the speed relative to the lateral movement of scanning head 10, resulting in a 2:1 enlargement in the width of the original, and while scanning drum 1 makes one revolution, the larger recording drum 3 will also make one full revolution, resulting in a 2:1 enlargement in the length of the original.

By changing therefore the gear ratio and exchanging the recording drum for the desired size, an enlargement, reduction or controlled distortion of the original may be obtained and, by the use of the smudge rejector circuit, a clean and improved copy recorded.

It is understood that other types of variable speed transmission, as for instance friction roller and cone types and the like, will produce the same result.

A modified form of the present invention is shown in Figure 4, using the marking bar-helix wire method of recording. In this arrangement, driving shaft 26 is designed to transmit driving power to paper driving roller 28 by means of variable speed transmission 29. While scanning drum 30, recording drum 31 and partly threaded shaft 32, which latter shaft is threadedly engaged to scanning head 33, will rotate at identical speed, paper driving roller 28 is driven at a speed ratio determined by the setting of variable speed transmission 29.

In operation, the output of scanning head 33 is transmitted through an electrical circuit similar to that shown in Figure 1 to the marking bar 34. The electrolytic recording paper 35, which may be of standard commercial quality, has the property of producing a mark when current is passed through it, the density of the mark being proportional to the amount of current passed thru it. The markings, penetrating the entire thickness of the paper are of a permanent nature and the paper requires no further processing after recording. This electrolytic recording paper 35 is stored on roller 36 and during operation travels between the marking bar 34 and helix wire 37, and between idling roller 38 and paper driving roller 28, as shown in Figure 4.

The helix wire 37 is disposed helically upon the surface of recording drum 31, making one full turn on said drum. Means are provided for shortening or lengthening the pitch of the helix wire 37 along the projected length of the wire upon the drum 31, said means comprising for example an arrangement using a holding screw and a series of tapped holes disposed axially in said recording drum 31. The marking bar 34 disposed axially and in spaced relation to the recording drum 31 will produce a mark on the paper 35, whenever current is passed through said marking bar, only at the point where the helix wire passes under said marking bar. At this point, which moves along the full length of the marking bar during each revolution of recording drum 31, the marking bar 34 and the helix wire 37 are positioned at approximately right angles to each other.

Figures 6, 7:
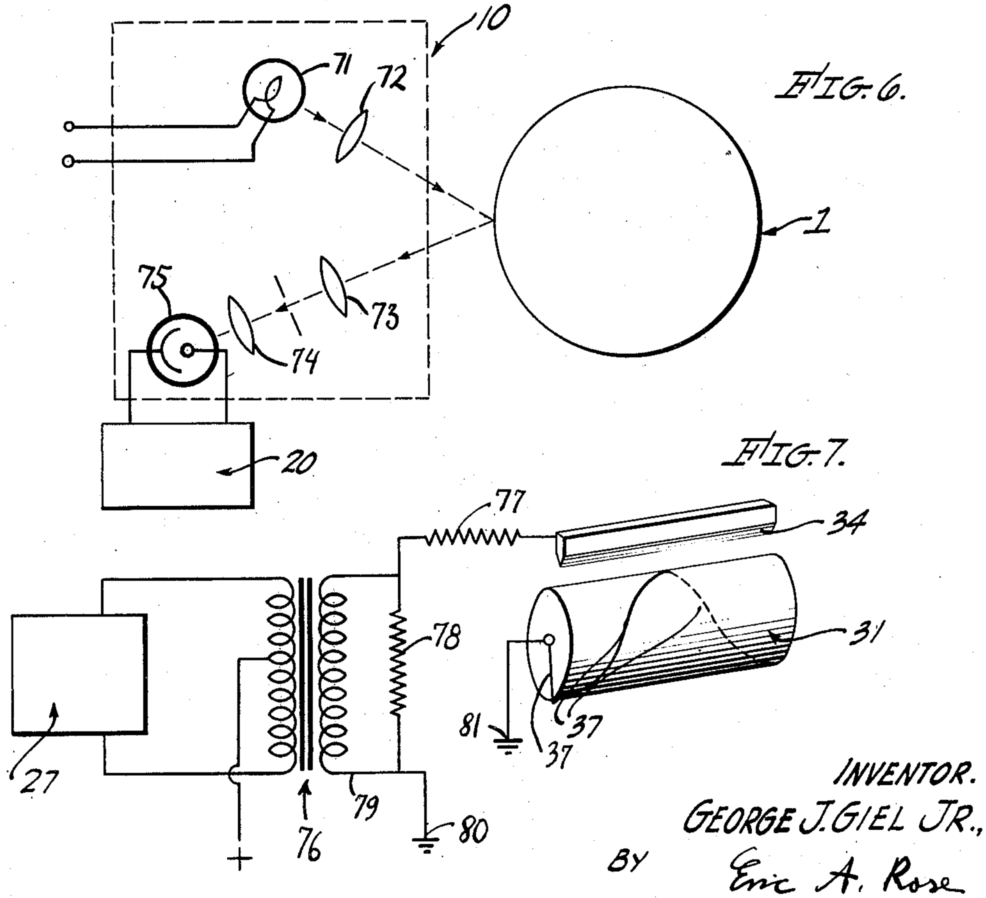
Figure 6 is a circuit wiring diagram of the scanning head shown in Figure 1.
Figure 7 is a circuit wiring diagram of the helical recording circuit, showing the receiving drum in the perspective.

Electrically, the marking bar 34 is connected to the power amplifier 27 through transformer 76 and resistances 77 and 78, one leg 79 of the secondary winding of the transformer 76 being grounded 80 as shown on Figure 7. The helix wire 37 is also grounded 81, as shown on Figure 7.

If a 2:1 enlargement is desired, the pitch of the helix wire must be set at twice the length of the circumference of the scanning drum 30, assuring thereby a 2:1 enlargement in the length of the original, the recorded copy being displaced by 90 degrees with respect to the original. At the same time, the rate of advance of the electrolytic recording paper 35 over driving roller 28 must be twice the rate of lateral advance of scanning head 33 on shaft 32 due to the action of variable speed transmission 29, assuring a 2:1 enlargement in the width of the original.

In this embodiment of the present invention, a change in the pitch of the helix wire and a corresponding change of the variable speed transmission 29 will therefore determine a resulting enlargement, reduction or controlled distortion of the recorded copy.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In an apparatus for facsimile recording and the like, in combination, means adapted to carry an original, a scanner producing electrical impulses which vary in accordance with the light and shade of successive elemental areas of equal size along a scanned line on the original, means producing a steady alternating current signal, means between said scanner and said last named means for modulating said alternating current with the electrical impulses originating in said scanner, said means comprising a resistance-capacitance bridge, and means for manually controlling the amplitude of the electrical impulses passing through said bridge, an aperiodic amplifier coupled to said bridge, means coupled to said amplifier for limiting the amplitude of said alternating current, said means comprising a pair of diodes, means coupled to the anode of one diode and the cathode of the other diode for supplying a bias to said diodes, and resistors coupled to said anode and said cathode for mixing the output of said pair of diodes, means coupled to said resistors for amplifying the output of said diodes, and means connected to said last named means for recording the alternating signal currents received from said last named means.

2. In combination, an original to be scanned, a scanner producing electrical impulses which vary in accordance with the light and shade of successive elemental areas of equal size along a scanned line on said original, a recorder, a transmission circuit interconnecting said scanner and said recorder, said transmission circuit comprising a source of alternating signal current, a manually adjustable resistance-capacitance bridge coupled between said source and said scanner adapted to cause a change in the amount of light entering the scanner to produce an unbalanced and amplitude modulation of said electrical impulses on said alternating signal current, an aperiodic amplifier coupled to said resistance-capacitance bridge, means eliminating from the alternating signal current amplitude changes below a predetermined value, said means comprising a pair of diodes, the anode of the first diode being connected to the cathode of the second diode, a capacitor coupling the anode of the first diode of the aperiodic amplifier, a resistor connected between the common terminal of said capacitor and said anode and the ground, an adjustable source of bias coupled to the cathode of the first diode and the anode of the second diode, resistors connected to the cathode of the first diode and to the anode of the second diode respectively for mixing the output of said diodes, and means coupled between said resistors and said recorder amplifying said output and transmitting said output to the recorder.

GEORGE J. GIEL, Jr.

REFERENCES CITED

The following references are of record in the file of this patent:

UNITED STATES PATENTS

| Number | Name | Date |
|---|---|---|
| 1,909,142 | Zworykin | May 16, 1933 |
| 2,108,983 | Finch | Feb. 22, 1938 |
| 2,109,109 | Finch | Feb. 22, 1938 |
| 2,136,340 | Hardy | Nov. 8, 1938 |
| 2,179,002 | Washington, Jr. | Nov. 7, 1939 |
| 2,227,109 | Shankweiler | Dec. 31, 1940 |
| 2,251,828 | Hammond | Aug. 5, 1941 |
| 2,301,024 | D'Humy | Nov. 3, 1942 |
| 2,376,034 | Collings, Jr. | May 15, 1945 |